3,262,992
COMPOSITION OF MATTER COMPRISING POLYPROPYLENE AND AN ETHYLENE-PROPYLENE COPOLYMER
Richard Holzer, Oberursel, Taunus, and Karl Mehnert, Hofheim, Taunus, Germany, assignors, by mesne assignments, to Hercules Incorporated, a corporation of Delaware
No Drawing. Filed Jan. 17, 1961, Ser. No. 83,168
Claims priority, application Germany, Jan. 23, 1960, F 30,382
2 Claims. (Cl. 260—876)

The present invention relates to a composition of matter.

It is known that shapes made from isotactic polypropylene undergo strong decrease in their impact strength and notched impact strength properties at temperatures of about $+10°$ C. and less due to the relatively high second order thermodynamic conversion point (second order transition temperature) of isotactic polypropylene.

It is, however, of great practical interest to produce material for making shapes which exhibits both good thermostability under load and good notched tear strength and impact strength, more especially at temperatures at about $+10°$ C. and less.

Various attempts have already been made to improve the mechanical properties of polypropylene at low temperatures, for example by admixture with highly polymeric components having low second order transition temperatures as disclosed, for example, in Belgian Patents 560,523; 568,684; 569,444; 570,100 and in U.S. patent application Serial No. 835,421, filed August 24, 1959.

In these known processes, isotactic polypropylene obtained, for example, by a Ziegler-type low pressure polymerization process (Ziegler-type polypropylene) is admixed with a 5–20% polyisobutylene or isobutylene-isoprene copolymers, or 5–40% polybutene or 5–20% of a copolymer of ethylene and propylene containing 30–70% by weight ethylene, or 10–70% of a crystalline ethylene/propylene copolymer containing 3–20% by weight propylene. By admixing these components the impact strength and notched impact strength of isotactic polypropylene at temperatures around 0° C. are improved, but the improvement is associated with a series of other disadvantages. Thus, for example, shapes made from components which are incompatible with one another, such as polypropylene and polyisobutylene, undergo strong white rupture on being bent. In view of the fact that the products used in the above patents (polyisobutylene, isobutylene-isoprene copolymers or copolymers of ethylene and propylene) have an amorphous structure or a crystallite melting point (polybutene) 40° C. lower than isotactic polypropylene, it is evident that portions of the composition will melt at as low a temperature at 125° C. and impair the thermostability under load of such polymer compositions.

Amorphous polymers, such as polyisobutylene, are soluble in a series of solvents. Compositions prepared with such amorphous polymers are therefore less stable to solvents than crystalline polymers.

Rubber-like products are more difficult to admix with finely pulverulent polypropylene and to homogenize than those products that are obtained in powder form in polymerization.

The present invention provides a composition of matter for making shapes, said composition consisting of low pressure polypropylene and heteroblock propylene-ethylene copolymers which advantageously contain propylene in a proportion greater than 50%.

The composition according to this invention is made using highly crystalline and high molecular polypropylene having a reduced specific viscosity of 2 to 15, measured at 135° C. in a 0.1 % solution in decahydronaphthalene.

Such propylene polymers are obtained by low pressure polymerization as described, for example, in Belgian Patent 538,782 by polymerizing propylene in the presence of a catalyst obtained by reacting a compound of an element of subgroups 4 to 6 of the Mendeléeff Periodic Table including thorium and uranium, with a metal, alloy, hydride or organo-metal compound of main groups 1 to 3 of the Mendeléeff Periodic Table, the polymerization being carried out under a pressure of up to 30 atmospheres and at temperatures between 20° C. and 150° C. in an inert organic liquid.

The above heteroblock copolymers can be prepared, for example, by Ziegler-type low pressure polymerization using a mixed catalyst consisting of a halogen compound of a metal of subgroups 4 to 6 of the Mendeléeff Periodic Table and an organic, if desired halogen-containing, compound of an element of main groups 1 to 3 of the Mendeléeff Periodic Table. More especially, the heteroblock copolymers are prepared by first contacting a monomer, for example ethylene, with the above catalysts, advantageously in a dispersant, then interrupting the polymerization for a short time by scavenging the polymerization mixture with an inert gas, adding the second monomer for a certain period of time, scavenging with the inert gas, adding the first monomer again and repeating the whole procedure as often as desired. This type of polymerization was described for example, by G. Natta in "J. Polymer Science" 34 (1959), Issue 127, page 542.

Heteroblock copolymers which are especially suitable for use in the compositions according to this invention can be obtained by periodically adding two or more olefins to the polymerization mixture as described in U.S. patent application Serial No. 33,433, filed June 2, 1960, and performing the polymerization with a polymerization catalyst that imparts to the growing macromolecule chains a high long life energy term (greater than 10 minutes) enabling the macromolecular chains to continue growing for some time, the polymerization catalyst being manufactured by reacting (1) a compound of an element of subgroups IV to VI of the Mendeléeff Periodic Table and (2) an organo-aluminum compound which may contain halogen, at a low temperature ranging from $-20°$ C. to $+40°$ C., the stoichiometric catalyst manufacturing conditions being selected in such a manner that aluminum trihalide and alkyl aluminum dihalide as reaction products are only formed in subordinate proportions of 0–30 mol-percent of compound (1), while dialkyl aluminum monohalide is allowed to form in a proportion of at least 100% of compound (1) from the organo-aluminum compound used.

The heteroblock copolymers used have the characteristic feature that in their polymeric chains the monomers, for example A and B, are not distributed at random as in the following scheme:

... ABAABABBABA ...

but are distributed in longer periodic sequences, each period consisting of the same monomers as illustrated in the following scheme:

... AAAAABBBBBBAAAAAABBBBB ...

The length of the individual periods may vary within wide limits. Thus, for example, the process described above leads to more or less long periods of the respective monomer depending on the time for which a monomer is added to the polymerization mixture between the individual inert gas-scavenging periods.

The compositions obtained according to this invention are advantageously made using 5–70% by weight (calculated on the whole composition) of a heteroblock copolymer which contains a predominant proportion of propylene (more than 50%), has a high crystallite melting point (140–170° C.), good impact strength and notched impact strength properties at a temperature of about 0° C. and less, and simultaneously a rigidity which is substantially not inferior to that of pure isotactic polypropylene, and has a reduced specific viscosity of between 2 and 15, measured at 135° C. as a 0.1% solution in decahydronaphthalene.

As more fully described in U.S. patent application Serial No. 33,433 cited above, crystallized heteroblock ethylene-propylene copolymers exhibit great structural differences depending on the manufacturing conditions and the ratio in which the monomers are used, and therefore also differ from one another in their mechanical properties (cf. Table 1 below). All these different ethylene-propylene heteroblock copolymers can be admixed with polypropylene with which they are compatible in any mixing ratio. In other words, the properties of polypropylene compositions can be varied within certain limits by appropriate selection of the amount and type of the ethylene-propylene heteroblock copolymer.

The polypropylene can be admixed with ethylene-propylene heteroblock copolymers in known manner, for example, on a mixing roller or extruder before granulation, or the reaction mixtures obtained during polymerization may be mixed with one another before the polymers are worked up.

In the following tables, × represents the multiplication symbol, and DIN identifies published German test standards which in this case relate to standards for strength, hardness, etc. of the materials used.

EXAMPLE 1

(A) Preparation of heteroblock copolymer (product No. I of Table 1): 15 liters of toluene and 0.24 mol of a TiCl₃-catalyst prepared as described in Example C6 of U.S. patent application Serial No. 33,433 cited above were introduced into a polymerization vessel and the following components were added at 45° C. in gas form:

Propylene for 20 minutes
$N_2$ for 2 minutes
Ethylene for 3 minutes
$N_2$ for 5 minutes This polymerization cycle was repeated 10 times. For convenience, the course of polymerization is represented in short as follows:

$$10 \times //20P/2N_2/3E/5N_2//$$

The figures after the double slash represent the time of introduction in minutes, P means propylene, $N_2$ means nitrogen and E means ethylene.

After treatment with n-butanol and water, the product was filtered off. The residue was stirred for 30 minutes at 50° C. in toluene while adding alkali, again filtered off, subjected to steam distillation, and dried at 50° C. The filtered material was then evaporated to dryness. The dried material contained 4.6% by weight of the product in the form of soluble constituents.

Ultrared analysis indicated that the product consisted to about 90% by weight of $C_3$-structures.

(B) Preparation of composition: Powdered polypropylene was intensely mixed for 5 minutes in a commercial rapidly rotating powder mixer with varying amounts of copolymer I prepared as described above and 0.2% 4.4-thio-bis-[(6-tert.butyl)-m-cresol] as stabilizer.

*Table 1*

| Propylene/ ethylene heteroblock copolymers product No. | Crystallite melting point, °C. | Notched impact strength,[a] cm. kg./cm.², DIN 53453 | | | Ball indentation hardness,[a] kg./cm.², DIN 57302 | Flexural stress [a] at a given deflection (20°), kg./cm.² | Reduced specific viscosity [b] |
|---|---|---|---|---|---|---|---|
| | | +20° C. | 0° C. | −20° C. | | | |
| I | 159–163 | 14.1 | 7.4 | 3.2 | 479/430 | 348 | 4.5 |
| II | 161–165 | 41.1 | 22.7 | 8.0 | 365/319 | 277 | 4.3 |
| III | 163–168 | 24.5 | 9.3 | 5.1 | 519/462 | | 4.5 |
| IV | 164–168 | (c) | 13.5 | 4.3 | 513/468 | | 5.2 |
| V | 163–167 | 43.8 | 24.9 | 3.8 | 612/559 | 365 | 12.4 |
| VI | 159–163 | 26.0 | 8.2 | 4.3 | 589/538 | 390 | 6.3 |
| VII | 164–169 | (c) | (c) | (c) | 395/358 | | 12.8 |
| VIII | 163–168 | (c) | (c) | 36.3 | 419/381 | | 6.5 |
| IX | 163–168 | (c) | 31.3 | 10.7 | 455/412 | | 5.0 |
| X | 163–167 | (c) | 20.7 | 7.1 | 466/412 | | 5.0 |

[a] Measured at press plates.
[b] Viscosity measured in a capillary viscosimeter at 135° C. as a 0.1% solution in decahydronaphthalene.
[c] Without break.

The polymer compositions of this invention offer the advantage to possess improved properties as compared with known polymer compositions.

The crystalline heteroblock copolymers have a molecular structure similar to polypropylene and are therefore well compatible with this substance. Shapes made from these compositions therefore involve no white rupture stronger than pure polypropylene.

Due to the high crystalline melting point (higher than 150° C.) of the heteroblock copolymer used, the good thermostability under load of crystalline polypropylene in the composition is not substantially diminished.

The compositions prepared according to this invention are as stable to solvents as pure crystalline polypropylene and exhibit good mechanical properties at low temperatures (cf. Tables 2 and 4) below.

For making the compositions containing crystalline polypropylene, it is very advantageous to produce the heteroblock copolymers in powder form by low pressure polymerization.

The following examples serve to illustrate the invention but they are not intended to limit it thereto.

The resulting powder mixtures were granulated in the usual manner and then molded into test specimens.

Table 2 below indicates the measured results obtained for various compositions compared with the results for pure polypropylene.

EXAMPLE 2

(A) Preparation of heteroblock copolymer (product No. II of Table 1): The solvent and catalyst were the same as used in Example 1.

The polymerization cycle was as follows:

| | Minutes |
|---|---|
| Propylene | 18 |
| $N_2$ | 2 |
| Ethylene | 5 |
| $N_2$ | 5 |

The whole cycle was repeated 10 times.
Scheme:

$$10 \times //18P/2N_2/5E/5N_2//$$

7.1% by weight were soluble proportions. Ultrared analysis indicated 85% by weight of $C_3$-structures.

The heteroblock copolymers III to X listed in Table 1 were prepared in a manner analogous to that described in Examples 1A and 2A and according to the polymerization scheme indicated in Table 3.

(B) A composition of 50% polypropylene and 50% of copolymer II prepared as described above and containing 0.2% N-stearoyl-p-aminophenol as stabilizer was made into test specimens as described in Example 1. The values measured are indicated in Table 4.

EXAMPLE 3

A composition of 80% of polypropylene and 20% of copolymer VIII prepared as indicated in Table 3 and a composition of 90% polypropylene and 10% of copolymer IX prepared as indicated in Table 3, respectively, were made into test specimens in the manner described in Example 1 while adding 0.2% N-stearoyl-p-aminophenol as stabilizer. The measured values are indicated in Table 5 below.

Table 2

| Product | Notched impact strength,[a] cm. kg./cm.$^2$, DIN 53453 | | | Impact strength,[a] cm. kg./cm.$^2$, DIN 53452 | | | Ball indentation hardness,[a] kg./cm.$^2$, DIN 57302 |
|---|---|---|---|---|---|---|---|
| | +20° C. | 0° C. | −20° C. | +20° C. | 0° C. | −20° C. | |
| 100% polypropylene | 5.39 | 2.18 | 1.72 | (d) | 20.18 | 11.4 | 717/656 |
| 90% polypropylene+10% heteroblock copolymer propylene/ethylene [e] | 8.02 | 2.47 | 1.85 | (d) | 57.80 | 12.61 | 707/639 |
| 80% polypropylene+20% heteroblock copolymer propylene/ethylene [e] | 11.49 | 2.87 | 1.93 | (d) | 61.48 | 14.34 | 700/628 |
| 70% polypropylene+30% heteroblock copolymer propylene/ethylene [e] | 13.47 | 5.38 | 2.38 | (d) | 69.97 | 22.5 | 697/634 |
| 60% polypropylene+40% heteroblock copolymer propylene/ethylene [e] | 16.94 | 6.3 | 3.34 | (d) | 89.06 | 33.63 | 637/577 |
| 100% propylene ethylene heteroblock copolymer [e] | 44.1 | 22.7 | 8.0 | | | | 365/319 |

| Product | Flexural stress[a] at a given deflection (20°), kg./cm.$^2$ | Modulus in torsion[b] 120° C. kg./cm.$^2$ | Vicatindex, ° C. | Tensile strength,[c] kg./cm.$^2$ | Tear strength,[c] kg./cm.$^2$ | Elongation at break, percent |
|---|---|---|---|---|---|---|
| 100% polypropylene | 523 | 315 | 81 | 292 | 377 | 709 |
| 90% polypropylene+10% heteroblock copolymer propylene/ethylene [e] | 450 | 300 | 85 | 270 | 372 | 714 |
| 80% polypropylene+20% heteroblock copolymer propylene/ethylene [e] | 449 | 295 | 79 | 264 | 360 | 721 |
| 70% polypropylene+30% heteroblock copolymer propylene/ethylene [e] | 430 | 305 | 79 | 256 | 368 | 764 |
| 60% polypropylene+40% heteroblock copolymer propylene/ethylene [e] | 410 | 300 | 77 | 258 | 368 | 750 |
| 100% propylene ethylene heteroblock copolymer [e] | 277 | | | | | |

[a] Measured at press plates.
[b] Time of load: 60 seconds, torsion angle 32–38°.
[c] Measured at pressed test rods 25 x 3 x 1 mm., elongation rate 100 mm./min.
[d] Withoug break.
[e] Corresponding to Table 1, No. I, prepared as described in Example 1.

Table 3

| Product number | Solvent | Amount of catalyst mol | Temperature, ° C. | Scheme of polymerization | Soluble portion, percent by weight | C$_3$-structure, percent by weight approx. |
|---|---|---|---|---|---|---|
| III | 1 l. toluene | 0.008 | 70 | 4X//30P/15N$_2$/15E/15N$_2$// | 8.3 | 50 |
| IV | do | 0.008 | 50 | 7X//30P/10N$_2$/3E/10N$_2$// | 7 | 85 |
| V | do | 0.008 | 40 | 8X//30P/1E/5N$_2$// | 4.8 | 90 |
| VI | do | 0.01 | (a) | 4X//30P/10N$_2$/5E/10N$_2$// | 14.8 | 80 |
| VII | do | 0.008 | 60 | 4X//30P/15N$_2$15E/15N$_2$// | 4.7 | 50 |
| VIII | do | 0.008 | 50 | 4X//30P/15N$_2$/15E/15N$_2$// | 4.3 | 50 |
| IX | do | 0.008 | 50 | 5X//30P/5N$_2$/5E/5N$_2$// | 6.7 | 60 |
| X | do | 0.008 | (a) | 5E/5N$_2$/then/3X//30P/5N$_2$/5E/5N$_2$// | 11.7 | 65 |

[a] Propylene polymerization at 50° C., ethylene polymerization at temperatures of up to 80° C.

Table 4

| Product | Notched impact strength,[a] cm.kg./cm.$^2$, DIN 53453 | | | Tensile impact strength,[a] cm.kg./cm.$^2$ | Ball indentation hardness,[a] kg./cm., DIN 57302 | Flexural stress[a] at a given deflection (20°), kg./cm.$^2$ | Modulus of torsion at 120° C.[b] | Vicatindex, ° C. | Bottle fall test [c] |
|---|---|---|---|---|---|---|---|---|---|
| | +20° C. | 0° C. | −20° C. | | | | | | |
| 100% polypropylene | 7.31/ | 1.79/ | 1.97 | 280 | 652/588 | 477 | 360 | 80 | 4.4 |
| 50% polypropylene+50% propylene/ethylene heteroblock copolymer[d] | 15.8/ | 3.09/ | 2.47 | 336 | 552/96 | 392 | 305 | 74 | 32.6 |
| 100% propylene/ethylene heteroblock copolymer, product II | 14.1/ | 7.4/ | 3.2 | | 479/430 | 348 | | | |

[a] Measured at press plates.
[b] Time of load: 60 seconds; angle of torsion: 32–38°
[c] The test was carried out using closed 500 cc. bottles filled with water. The data found represent relative values and can only be compared with one another.
[d] Corresponding to Table 1, product II, prepared as described in Example 2A.

Table 5

| Product | Notched impact strength,a cm. kg./cm.², DIN 53453 | | | Impact strength,a cm. kg./cm.², DIN 53452 | | | Ball indentation hardness,a kg./cm.², DIN 57302 |
|---|---|---|---|---|---|---|---|
| | +20° C. | 0° C. | −20° C. | +20° C. | 0° C. | −20° C. | |
| 80% polypropylene +20% heteroblock copolymer VIII | 15.4 | 7.2 | 5.4 | Without break. | 71.2 | 23.4 | 701/636 |
| 90% polypropylene +10% heteroblock copolymer IX | 10.29 | 3.39 | 2.10 | ----do------ | 60.87 | 13.98 | 710/047 |

| Product | Flexural stress at a given deflection a (20°), kg./cm.² | Modulus of torsion,b 120° C., kg./cm.² | Vicat index, ° C. | Tensile strength,c kg./cm.² | Tear strength,c kg./cm.² | Elongation at break,c percent |
|---|---|---|---|---|---|---|
| 80% polypropylene +20% heteroblock copolymer VIII | 472 | 300 | 80 | 265 | 370 | 728 |
| 90% polypropylene +10% heteroblock copolymer IX | 488 | 307 | 83 | 288 | 375 | 710 | a Measured at press plates.
b Time of load: 60 seconds; angle of torsion 32-38°.
c Measured at pressed test rods 25 x 3 x 1 mm.; rate of elongation: 100 mm./min.

We claim:
1. Composition of matter containing highly crystalline and high molecular polypropylene having a reduced specific viscosity of 2 to 15, measured at 135° C. in a 0.1% solution in decahydronaphthalene, and a heteroblock copolymer of polypropylene and polyethylene segments, the said copolymer containing more than 50% by weight propylene and the total composition containing 5-70% by weight of said heteroblock copolymer.

2. The composition of claim 1 in which the heteroblock copolymer has a reduced specific viscosity of 2 to 15, measured at 135° C. in a 0.1% solution in decahydronaphthalene.

References Cited by the Examiner

UNITED STATES PATENTS

| 2,727,024 | 12/1955 | Field et al. | 260—94.9 |
| 2,882,263 | 4/1959 | Natta et al. | 260—93.7 |
| 3,036,987 | 5/1962 | Ranalli | 260—876 |

FOREIGN PATENTS

| 602,151 | 7/1960 | Canada. |
| 777,538 | 6/1957 | Great Britain. |
| 594,018 | 5/1959 | Italy. |

MURRAY TILLMAN, *Primary Examiner.*

DANIEL ARNOLD, LEON J. BERCOVITZ, WILLIAM H. SHORT, *Examiners.*

R. N. COE, J. A. KOLASCH, E. B. WOODRUFF,
*Assistant Examiners.*